(12) United States Patent
Shindou

(10) Patent No.: US 10,649,435 B2
(45) Date of Patent: May 12, 2020

(54) TOOL LIFE ESTIMATING DEVICE

(71) Applicant: FANUC Corporation, Yamanashi (JP)

(72) Inventor: Masaaki Shindou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 76 days.

(21) Appl. No.: 15/851,070

(22) Filed: Dec. 21, 2017

(65) Prior Publication Data

US 2018/0181105 A1      Jun. 28, 2018

(30) Foreign Application Priority Data

Dec. 22, 2016  (JP) ................... 2016-250057

(51) Int. Cl.
  *G05B 19/4065*  (2006.01)
(52) U.S. Cl.
  CPC ............ *G05B 19/4065* (2013.01); *G05B 2219/37209* (2013.01); *G05B 2219/37518* (2013.01)
(58) Field of Classification Search
  CPC ...... G05B 19/4065; G05B 2219/37209; G05B 2219/37518
  See application file for complete search history.

(56) References Cited

U.S. PATENT DOCUMENTS

| 5,251,144 | A | 10/1993 | Ramamurthi |
| 5,571,957 | A | 11/1996 | Tanaka |
| 2004/0039560 | A1 | 2/2004 | Hofmann |
| 2005/0246150 | A1 | 11/2005 | Shiromaru et al. |
| 2013/0132001 | A1 | 5/2013 | Yacout et al. |
| 2015/0314411 | A1 | 11/2015 | Samukawa et al. |
| 2017/0091667 | A1 | 3/2017 | Yukawa |
| 2017/0117841 | A1 | 4/2017 | Watanabe et al. |

FOREIGN PATENT DOCUMENTS

| CN | 1659427 A | 8/2005 |
| CN | 101799674 A | 8/2010 |
| DE | 19643383 A1 | 5/1998 |

(Continued)

OTHER PUBLICATIONS

Mejia et al, CNC Machine Tool's Wear Diagnostic and Prognostic by Using Dynamic Bayesian Neworks, Oct. 5, 2011, https://hal.archives-ouvertes.fr/hal-00672204 (Year: 2011).*

(Continued)

*Primary Examiner* — Austin Hicks
(74) *Attorney, Agent, or Firm* — Hauptman Ham, LLP

(57) ABSTRACT

Provided is a tool life estimating device that enables estimation of a life of a tool used in a machine tool according to changes in machining conditions. The tool life estimating device includes a state observation unit that acquires machining information indicative of a status of the machining in a state where the life of the tool remains sufficiently, wherein the machining information is acquired from log data recorded while the machine tool is operated, and creates input data based on the machining information that has been acquired; a learning unit that constructs a learning model in which clusters of the machining information are created by unsupervised learning using the input data that has been created by the state observation unit; and a learning model storage unit that stores the learning model.

4 Claims, 6 Drawing Sheets

(56) References Cited

FOREIGN PATENT DOCUMENTS

| | | |
|---|---|---|
| DE | 102016011532 A1 | 3/2017 |
| EP | 1205830 A1 | 5/2002 |
| JP | H6-170696 A | 6/1994 |
| JP | H6-344246 A | 12/1994 |
| JP | H7-51998 A | 2/1995 |
| JP | 11-170102 A | 6/1999 |
| JP | 2002-224925 A | 8/2002 |
| JP | 2002-254272 A | 9/2002 |
| JP | 2006-205289 A | 8/2006 |
| JP | 2011-230206 A | 11/2011 |
| JP | 2014-113675 A | 6/2014 |
| JP | 6010204 B1 | 10/2016 |

OTHER PUBLICATIONS

Office Action in CN Application No. 201711386429.9, dated May 24, 2019, 12pp.
Office Action in JP Application No. 2016-250057, dated Mar. 20, 2018, 10pp.
Nie Jianlin, "Research on Intelligent Management System of Numerical Control Cutting Tool Life," Master Degree Dissertation of Chongqing University, May 31, 2006, pp. 1-3, 25-30 and 45-47 of the Dissertation. (Partial translation).
Office Action in CN Application No. 201711386429.9 dated Dec. 2, 2019, 15pp.
Office Action in DE Application No. 102017011896.5, dated Feb. 11, 2020, 14pp.

* cited by examiner

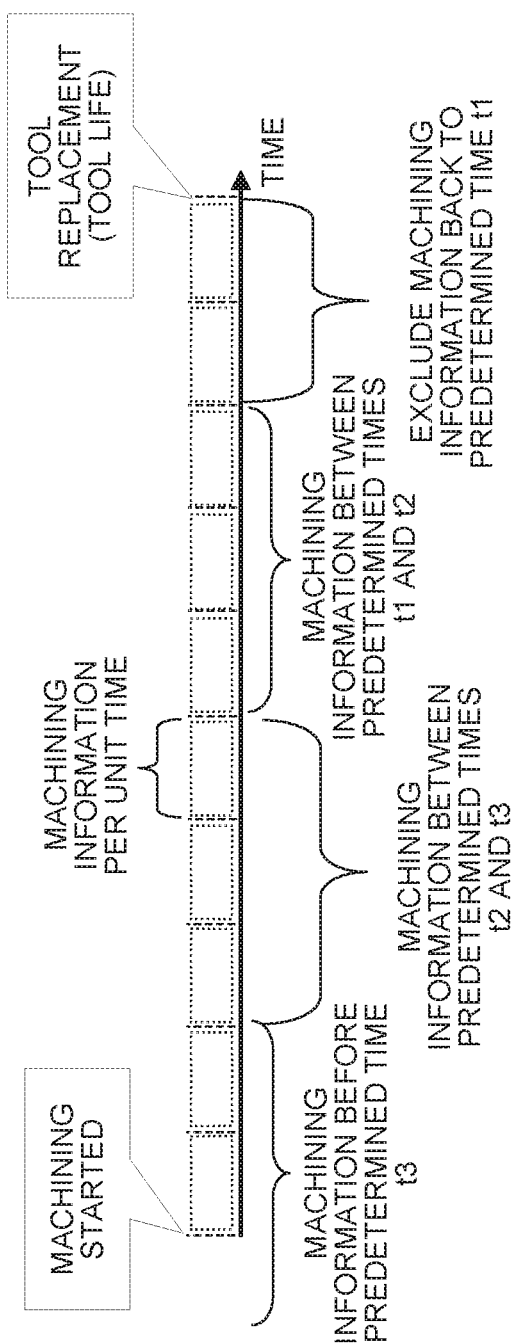

TOOL LIFE ESTIMATING DEVICE

RELATED APPLICATIONS

The present application claims priority to Japanese Patent Application Number 2016-250057, filed Dec. 22, 2016, the disclosure of which is hereby incorporated by reference herein in its entirety.

BACKGROUND OF THE INVENTION

Field of the Invention

The present invention relates to a tool life estimating device.

Description of the Related Art

Typically, a cutting edge of a tool used on a machine tool wears with the passage of time as it is used in machining, causing increase in cutting resistance. Also, as the wear progresses, the machining accuracy of the tool deteriorates, making it difficult to maintain prescribed machining accuracy required for a workpiece. The tool thus reaches the end of its life. The tool that has reached the end of its life needs to be replaced by another one, otherwise it would not be able to continue the machining. However, when the tool reaches the end of its life during automatic operation of the machine tool, it may happen that the tool cannot be replaced immediately in the absence of an operator at the site when the end of the life of the tool is reached, which is one of the factors that hinder the efficiency of the machining cycle. For that reason, a technique for estimating the tool life in advance is of importance.

It is difficult to estimate the life of a tool on or in a machine tool because it varies depending on the workpiece to be machined and the machining conditions. Although it is possible to use a method for estimating the tool life according to the machining time and the number of times of the machining, the accuracy of the estimation by this method is not high and in some cases the operator has to check the tool each time to determine the tool life.

As a conventional technique relating to tool life estimation, Taylor's lifetime equation is known (Japanese Patent Laid-Open No. 11-170102, etc.). When estimating the tool life using the Taylor's lifetime equation, it is possible to estimate the tool life under the various machining conditions by defining a constant based on the machining conditions such as the tool to be used in the machining and the material of the workpiece, and by applying the constant that has been defined to the Taylor's lifetime equation. In addition, a technique for estimating a life of a tool based on machining time, the number of times of machining, and the like has also been proposed (Japanese Patent Laid-Open No. 2002-224925, etc.).

However, when the life of the tool is to be predicted using the Taylor's lifetime equation, the drawback is that the constant of the equation needs to be calculated according to the machining conditions, as a result of which determination of the constant for a machine tool whose machining conditions frequently change becomes complicated, making it difficult to apply the constant to the equation.

Also, when estimating the life of the tool based on the machining time, the number of times of machining, and the like, it is necessary to record the machining times and the numbers of times of the machining for respective tools. In addition, since the estimation method for estimating the tool life depends upon on rules of thumb based on actual machining, a problem arises that prediction of the tool life is difficult in a situation where the machining conditions frequently change.

SUMMARY OF THE INVENTION

It is therefore an object of the present invention to provide a tool life estimating device capable of estimating the life of a tool used in a machine tool according to the change in the machining conditions.

According to the present invention, in a production facility having a machine tool of a manufacturing industry, machining information indicative of a status of machining is collected from the machine tool, and a machine learning device is made to learn a status where the tool life remains based on the machining information that has been collected. When the learning by the machine learning device has been completed, the machine learning device is made to estimate whether or not the status of the machining while the machining is performed by the machine tool corresponds to a status where the tool life remains, and the fact that an end of life of a tool is close is notified to the machine tool that has been estimated to be in a status of the machining that is out of the status where the tool life remains.

In addition, a tool life estimating device according to the present invention, which estimates a life of a tool used in machining of a workpiece by a machine tool, includes a state observation unit configured to acquire machining information indicative of a status of the machining in a state where the life of the tool remains sufficiently, wherein the machining information is acquired from log data recorded while the machine tool is operated, and create input data based on the machining information that has been acquired; a learning unit configured to construct a learning model in which clusters of the machining information are created by unsupervised learning using the input data that has been created by the state observation unit; and a learning model storage unit configured to store the learning model.

Also, the tool life estimating device according to the present invention, which estimates a life of a tool for use in machining of a workpiece by a machine tool, includes a learning model storage unit configured to store a learning model in which clusters of machining information are created by unsupervised learning based on the machining information indicative of a status of the machining in a state where the life of the tool remains sufficiently, wherein the machining information is acquired while the machine tool is operated; a state observation unit configured to acquire the machining information indicative of the status of the machining from log data recorded while the machine tool is operated and create input data based on the machining information that has been acquired; and an estimation unit configured to estimate the life of the tool from the input data that has been created by the state observation unit.

In addition, the machine tool according to the present invention includes an alarm unit configured to output an alarm based on the results of estimation of the life of the tool by the tool life estimating device.

According to the present invention, by virtue of estimating the tool life using the machine learning device, it is not necessary to calculate a constant according to the machining conditions like the lifetime equation and the tool life does not need to be recorded for each machining condition, so that it is made possible to estimate the tool life with high precision according to various situations.

BRIEF DESCRIPTION OF THE DRAWINGS

The above-described and other objects and features of the present invention will be apparent from the following description of embodiments with reference to the accompanying drawings, in which:

FIG. 9 is a diagram for explaining the machining information for use in machine learning according to another embodiment of the present invention.

DETAILED DESCRIPTION OF THE PREFERRED EMBODIMENTS

Embodiments of the present invention will be described hereinbelow with reference to the drawings.

Figure 1:
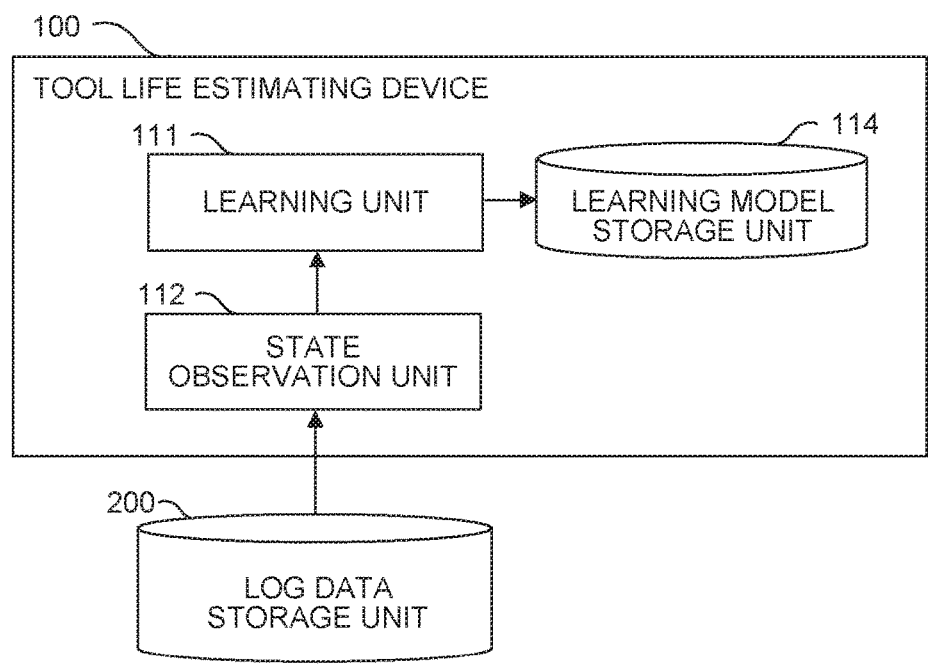
FIG. 1 is a schematic functional block diagram of a tool life estimating device at the time of learning according to an embodiment of the present invention.

FIG. 1 is a schematic functional block diagram of a tool life estimating device at the time of learning according to an embodiment of the present invention. The tool life estimating device 100 of this embodiment is configured to carry out machine learning in a production facility of a manufacturing industry having one or more machine tools, based on log data collected from at least one of the machine tools and stored in a log data storage unit 200.

The machining information acquired from a machine tool operating in a production facility is recorded along with time in the log data storage unit 200 as log data. The machining information includes the type of the tool used in the machining, the material of the workpiece, the type of the coolant, the feed rate of the tool, the rotation speed of the spindle, the temperature of the cutting edge, the cutting time aggregation/cutting distance aggregation for each tool, the cutting resistance (amplifier current value of an axis/spindle), and the like. The log data storage unit 200 may record pieces of the machining information collected from a plurality of machine tools as the log data. Further, the log data storage unit 200 may be constructed as a typical database.

In a machine tool an object from which the log data is to be collected, the workpiece is machined while controlling the respective drive units provided in the machine tool, and the states of the drive units and a detection value by a sensor are acquired from signals obtained from the respective units, and the log data relating to the machining operation of the machine tool is created and stored in a nonvolatile memory unit of the machine tool, a storage device as an external device, or the like. The log data is created such that the chronological transitions of operational statuses of the individual drive units and values of temperature and the like detected by sensors can be grasped. Also, the log data includes various pieces of information (such as a tool change/replacement operation) input by an administrator who operates the machine tool or maintenance personnel in charge of making a necessary response to occurrence of an abnormality in the machine tool via a machine operation panel. In this manner, the log data stored in the nonvolatile memory unit or the like of the machine tool is collected and sent to the log data storage unit 200 via a network or the like or via an external storage device or the like carried by an operator such as maintenance personnel of the machine tool. The collection may be performed sequentially each time the log data is created, or may be periodically performed with an appropriate interval.

Next, an outline of the learning carried out by the tool life estimating device 100 will be described before describing the individual features of the tool life estimating device 100.

Figure 2:
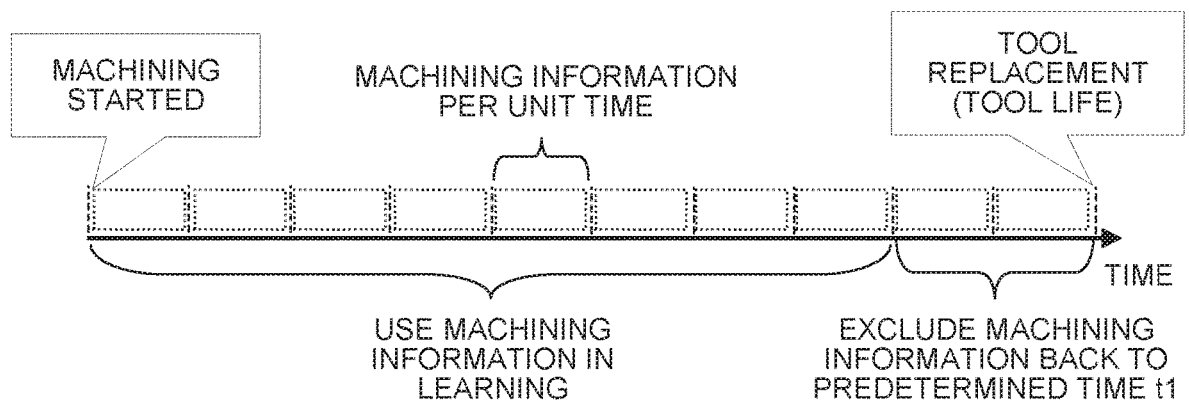
FIG. 2 is a diagram for explaining machining information for use in machine learning according to an embodiment of the present invention.

FIG. 2 is a diagram for explaining the machining information for use in the machine learning according to an embodiment of the present invention. The tool life estimating device 100 according to this embodiment collects the machining information at the time point at which the tool life remains sufficiently from the log data stored in the log data storage unit 200 and carries out unsupervised learning based on the machining information. The unsupervised learning by the tool life estimating device 100 according to this embodiment is carried out using pieces of the machining information obtained by dividing the machining information recorded in the log data storage unit 200 at every predetermined unit time. The unsupervised learning by the tool life estimating device 100 according to this embodiment is carried out for the purpose of generating clusters of the machining information at the time point at which the tool life remains sufficiently. For that purpose, as illustrated in FIG. 2, the tool life estimating device 100 according to this embodiment excludes the portion of the machining information corresponding to a period of time between (i) the time point at which the operator determined that the tool had reached the end of the tool life and replaced it by another tool and (ii) a previous time point preceding the time point of the replacement by a predetermined time t1 (e.g., one hour) (i.e., the machining information just before the end of the tool life) in the log data stored in the log data storage unit 200 and extract the remaining portions of the machining information for use in the learning. The method for excluding the portion of the machining information just before the end of the tool life of the tool life estimating device 100 of this embodiment may be configured such that a portion of the machining information in which an abnormal value occurs is excluded (because some portion of the machining information may exhibit an abnormal value just before the end of the tool life, for example, in a case where a predetermined value is particularly outstanding in comparison with the chronologically preceding and subsequent portions of the machining information).

Figure 3:
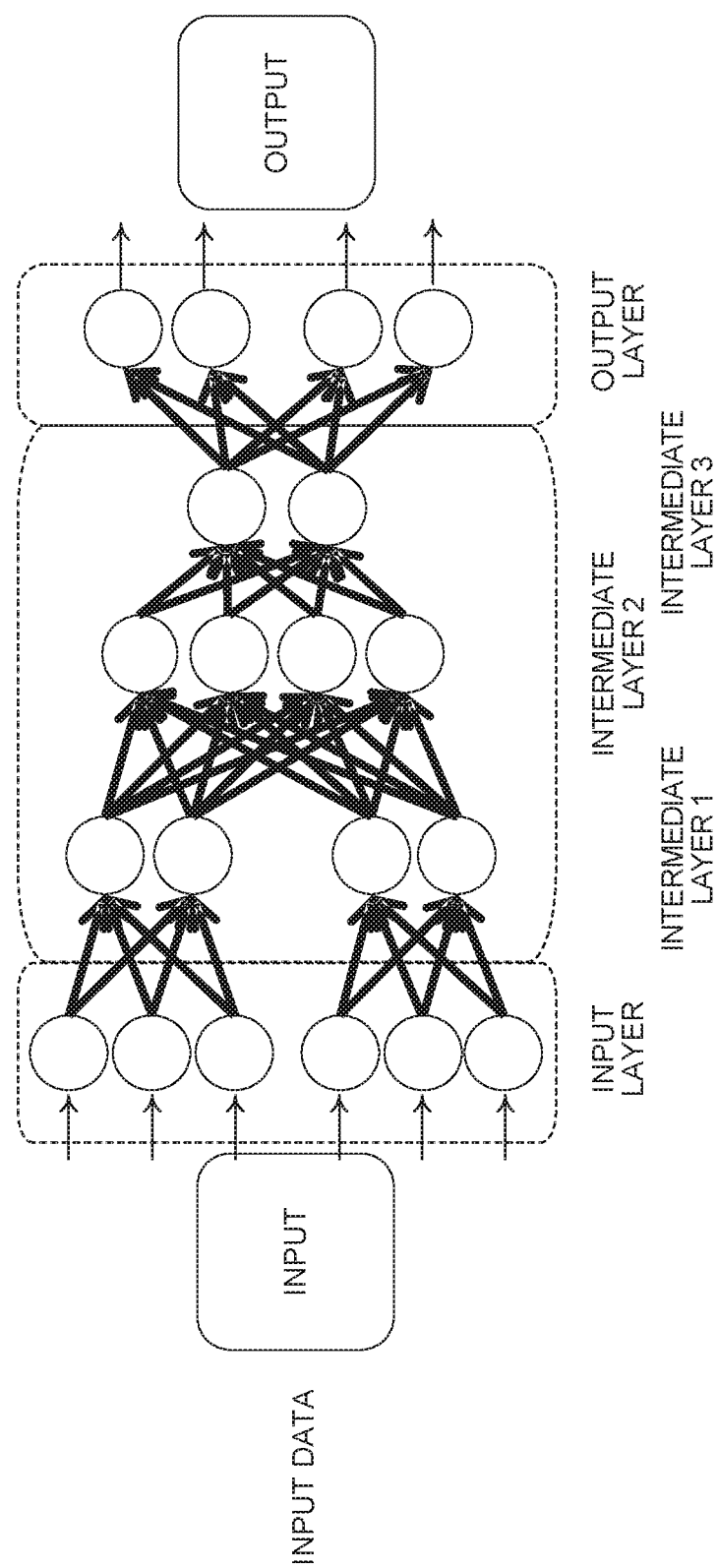
FIG. 3 is a diagram illustrating an example in the case where a multilayer neural network is used as a learning model.
Figure 4:
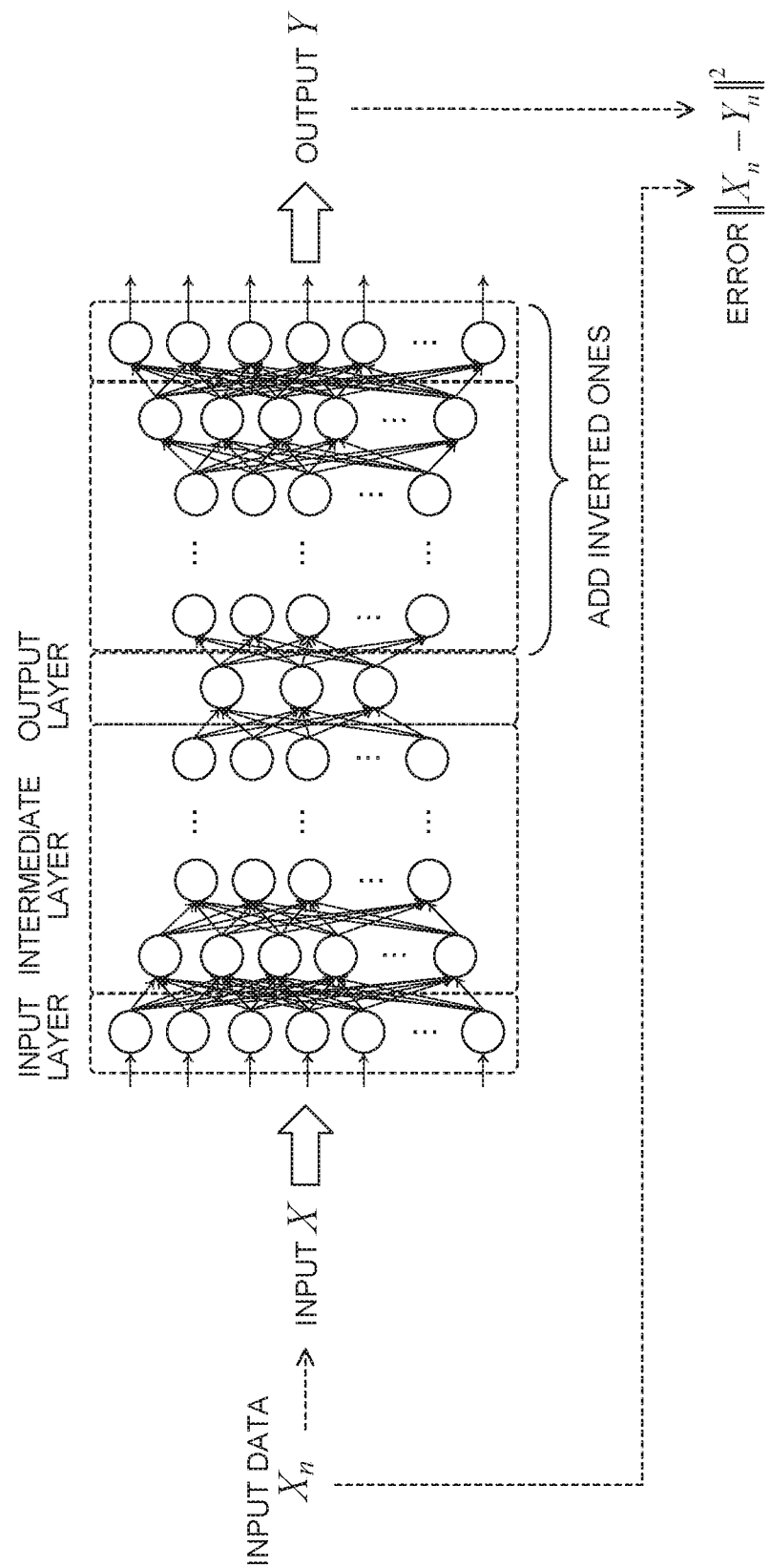
FIG. 4 is a diagram illustrating an example in the case where an autoencoder is used as a learning model.

According to the "unsupervised learning," by only giving a large amount of input data to the learning device, it is made possible to learn the specific distribution that the input data exhibits and carries out compression, sorting, shaping, and the like of the input data without the need of providing corresponding teacher output data. The tool life estimating device 100 according to this embodiment may use, for example, principal component analysis (PCA), support vector machine (SVM), a neural network, or the like as the algorithm of the unsupervised learning. Also, illustrated in FIG. 3, a method of deep learning may be used by using a plurality of intermediate layers of a neural network, in which case, a well-known auto encoder as illustrated in FIG. 4 may be constructed so that the residual is learned.

Figure 5:
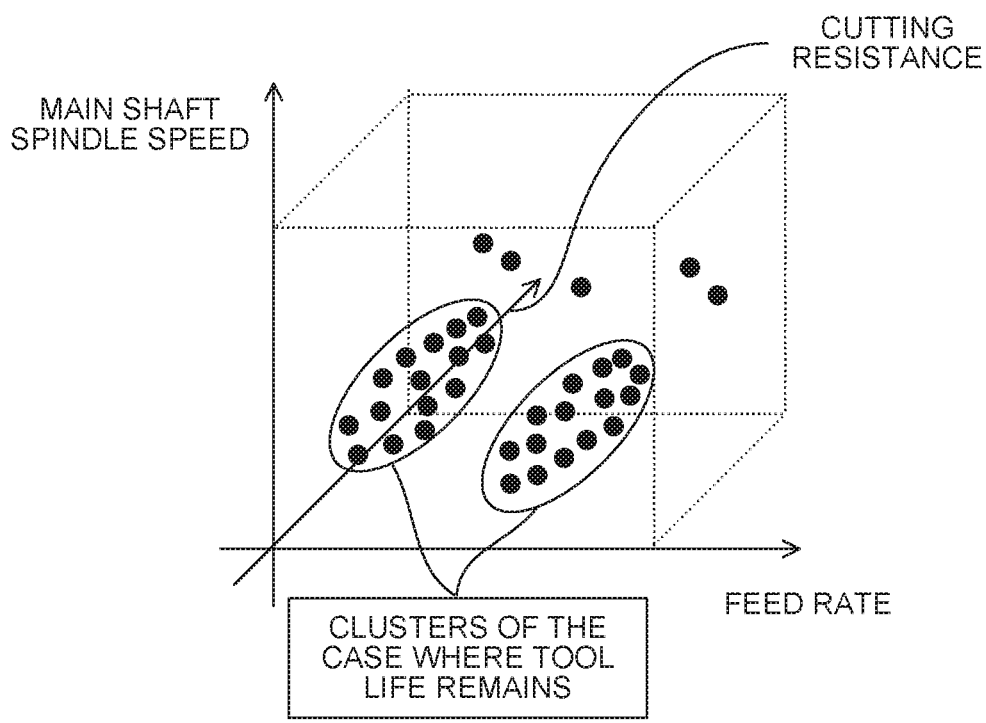
FIG. 5 is a diagram illustrating clusters of machining information in the case where a tool life remains.

FIG. 5 is a diagram that illustrates by way of example the clusters of the machining information in the case where the tool life remains. In FIG. 3, for the sake of simplification of the example, three pieces of information of the feed rate, the rotation speed of the spindle, and the cutting resistance are included as machining information, but in reality, the machining information will be expressed as more multidimensional information.

Next, the individual features of the tool life estimating device 100 will be described. The tool life estimating device 100 includes a learning unit 111, a state observation unit 112, and a learning model storage unit 114.

The learning unit 111 is a functional unit that carries out the unsupervised learning based on the input data acquired by the state observation unit 112, constructs a learning model, and stores the learning model in the learning model storage unit 114. The learning model that has been constructed by the learning unit 111 is configured as a model for sorting (clustering) to discriminate the machining information at the time point at which the tool life remains sufficiently from the remaining portions of the machining information as illustrated in FIG. 5. As described above, the algorithm of the learning model constructed by the learning unit 111 may be any one as long as it can sort and discriminate the machining information at the time at which the tool life remains sufficiently from the remaining portion thereof.

The state observation unit 112 creates the input data from the log data stored in the log data storage unit 200, and outputs the created input data to the learning unit 111. In the tool life estimating device 100 according to this embodiment, the input data is pieces of the machining information for each unit time acquired from the machine tool. For the machining information expressed as a numerical value, the state observation unit 112 uses the numerical value as the input data of the learning unit 111 on an as-is basis and, for the machining information indicated by information other than numerical values such as a character string, should store in a not-shown memory unit a conversion table for converting the individual character strings into numerical values, and convert the information other than numerical values into numerical values using the conversion table to include them in the input data.

By virtue of the above-described configuration, the tool life estimating device 100 is allowed to execute the learning about the machining information (machining state) at the time point at which the tool life at the time of operation of the machine tool remains sufficiently, and thereby construct the learning model.

Next, the tool life estimating device 100 for estimating the life of the tool using the learning model that has been constructed will be described.

Figure 6:
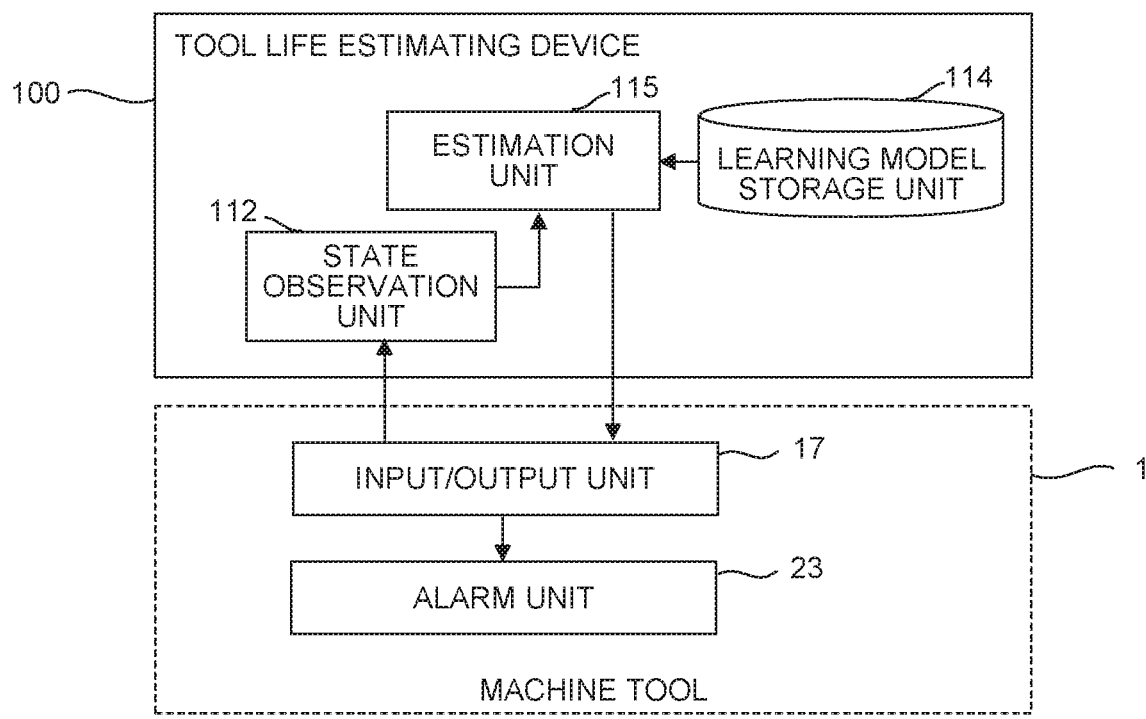
FIG. 6 is a schematic functional block diagram of the tool life estimating device at the time of estimating the tool life according to an embodiment of the present invention.

FIG. 6 is a schematic functional block diagram at the time of estimating the tool life by the tool life estimating device 100 according to an embodiment of the present invention. The tool life estimating device 100 according to this embodiment estimates the life of the tool used in the machine tool 1 based on the machining information including the information on the operating statuses of the individual drive units provided in the machine tool 1 and the information of the sensor(s) thereof acquired via the input/output unit 17 included in the machine tool 1 which constitutes the environment. The input/output unit 17 outputs information acquired internally or externally of the machine tool 1 to the processors internal and external to the machine tool 1. Although only the input/output unit 17 and the alarm unit 23 are illustrated in FIG. 6 as the function blocks provided on the machine tool 1, the machine tool 1 in practice includes the respective components of a typical machine tool such as a processor such as a CPU and a driving unit.

The tool life estimating device 100 includes a state observation unit 112, a learning model storage unit 114, and an estimation unit 115.

During the operation of the machine tool 1, the state observation unit 112 acquires the machining information used as the input data at the time of learning as described above via the input/output unit 17, and creates the input data based on the acquired information, and outputs it to the estimation unit 115.

Figure 7:
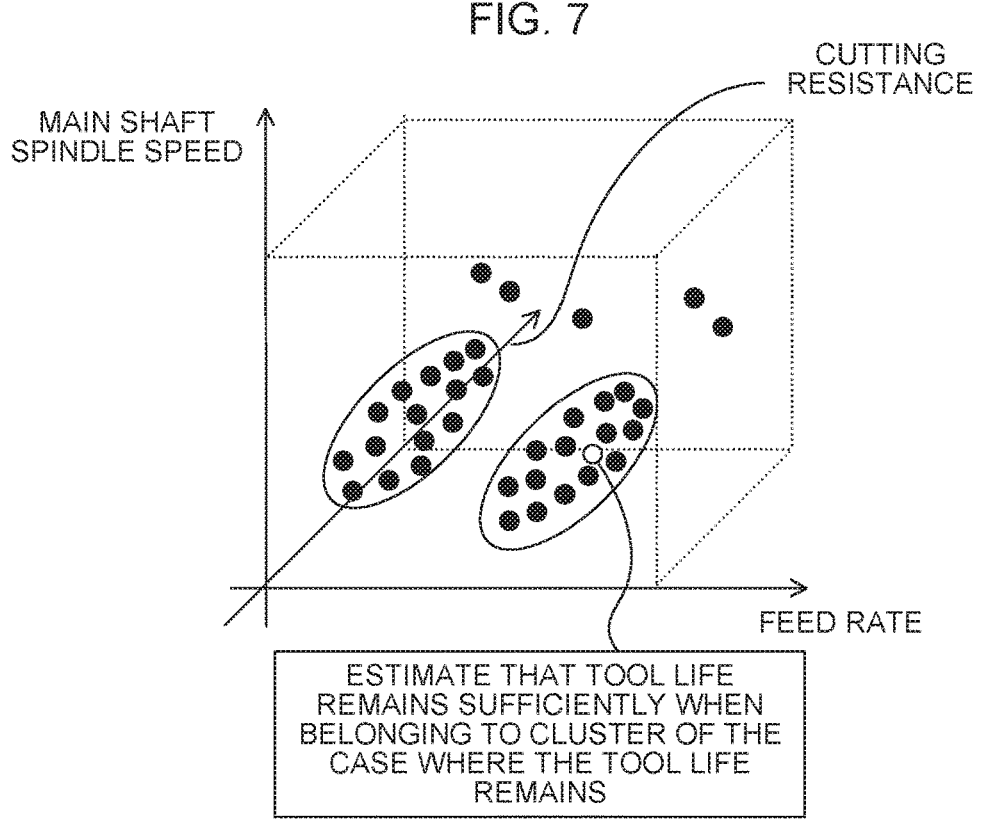
FIG. 7 is a diagram illustrating the relationship between machining information and the clusters in the case where the tool life is estimated to remain.
Figure 8:
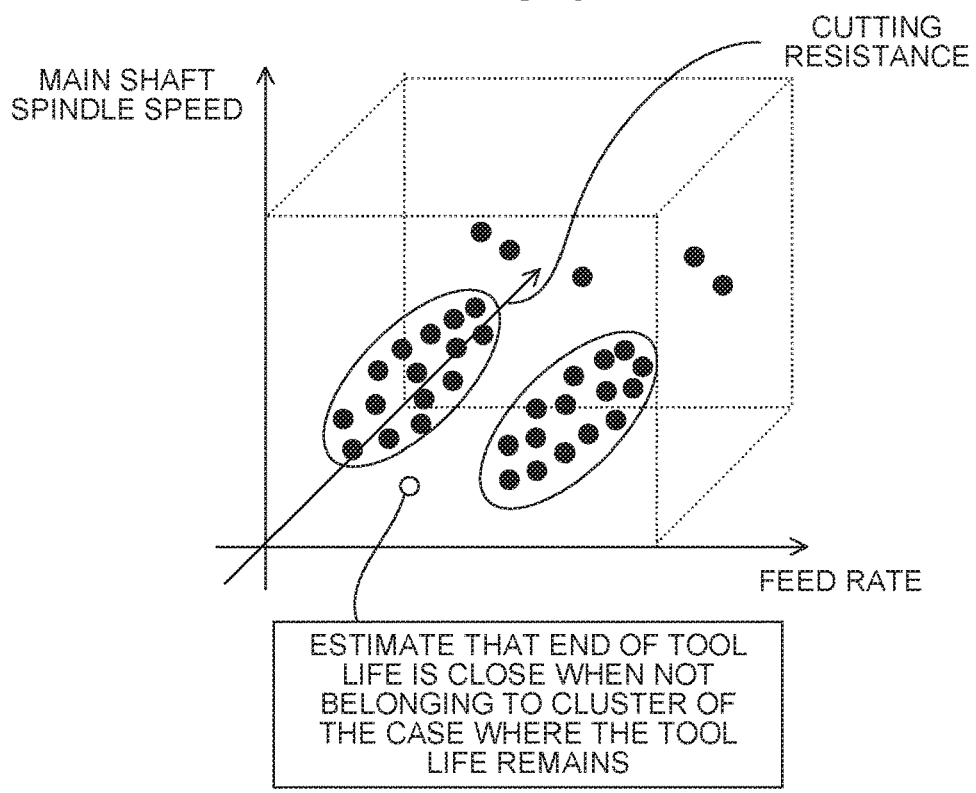
FIG. 8 is a diagram illustrating the relationship between the machining information and the clusters in the case where it is estimated that the tool life has come close to its end.

By using the learning model stored in the learning model storage unit 114, the estimation unit 115 determines which of the clusters of machining information the input data (machining information) input from the state observation unit 112 belongs and thereby estimate the tool life. As illustrated in FIG. 7, when the input data belongs to the cluster of the machining information at the time at which the tool life remains sufficiently, the estimation unit 115 estimates that the life of the tool used in the currently operating machine tool 1 remains sufficiently. Further, as illustrated in FIG. 8, when the input data input from the state observation unit 112 does not belong to the cluster of the machining information at the time point at which the tool life remains sufficiently, the estimation unit 115 estimates that the tool used in the currently operating machine tool 1 is just before the end of its life.

In this manner, the estimation unit 115 outputs, to the input/output unit 17 of the machine tool 1, the result of estimation of the tool life using the input data created based on the machining information obtained from the machine tool 1. The input/output unit 17 instructs the alarm unit 23 to issue an alarm if it is determined that the result of estimation of the tool life input from the estimation unit 115 indicates that the tool is just before its end of life.

When the alarm unit 23 is instructed by the input/output unit 17 to issue an alarm, the alarm unit 23 notifies to the operator, the fact that the tool is close to the end of life using a lamp arranged on a machine operation panel, indication by a display device, a sound, or the like. With regard to the alarm provided by the notification by the alarm unit 23, for example, as has been illustrated in FIG. 2, in a case where the machining information in the interval back to a predetermined time t1 before the end of the tool life is used in the learning of the machining information at the time point at which the tool life remains sufficiently, the specific time may be indicated as the alarm on the display device such as "End of life of tool will be reached in t1 hour."

As described above, it is made possible for the tool life estimating device 100 to estimate the tool life during the operation of the machine tool 1 by using the learning model obtained as a result of the learning based on the machining information in at least one or more machine tools 1. In addition, when the tool life estimating device 100 estimates that the end of the life of the tool is reached and an alarm is issued, then the operator of the machine tool 1 is allowed to systematically stop the operation of the machine tool in response to the estimation result and replace the tool by another one.

Whilst the embodiments of the present invention have been described in the foregoing, the present invention is not limited to the examples of the above-described embodiments. The present invention can be implemented in various modes with appropriate modifications made thereto.

In the above embodiment, the modes of learning and use in one tool life estimating device 100 is illustrated, but the learning model itself constructed by the learning unit 111 and stored in the learning model storage unit 114 is a set of pieces of data indicative of the results of learning, so that it is possible to configure the learning model to be shared with another tool life estimating device 100 via, for example, an external storage device (not shown), a network, or the like. In such a configuration, in the learning, in a state where one learning model is shared among a plurality of tool life estimating devices 100, the respective tool life estimating devices 100 carry out learning in parallel, making it possible to shorten the time required to complete the learning. Meanwhile, in the utilization of the learning model, it is also possible to estimate the tool life by the respective tool life estimating devices 100 using the shared learning model. The sharing method of the learning model is not limited to a specific method. For example, a learning model may be stored in a factory host computer and shared by the respective tool life estimating devices 100, or a learning model may be stored on a server installed by a manufacturer such that the learning model can be shared by the tool life estimating devices 100 of the clients.

In the above embodiment, the configurations of the tool life estimating device 100 at the time of learning and at the time of detection are described individually, but the tool life estimating device 100 may include simultaneously the configuration at the time of learning and the configuration at the detection. In such a configuration, the tool life estimating device 100 can estimate the tool life and cause the control the learning unit 111 to carry out further additional learning based on the information input by administrator or maintenance personnel in the machine tool 1.

Also, the above embodiment describes a case where the tool life estimating device 100 is configured as a separate body independent of the machine tool 1, but the tool life estimating device 100 may be configured as a part of the control device of the machine tool 1.

Further, in the above-described embodiment, the clusters of the machining information at the time point at which the tool life remains sufficiently is generated by machine learning. Meanwhile, as illustrated in FIG. 9, the machining information before the end of the life of the tool is reached may be divided, for example, into pieces such as a piece of the machining information corresponding to the period between a predetermined time t1 at which the end of tool life is reached and a predetermined time t2 preceding the time t1; a piece of information corresponding to the period between the predetermined time t2 at which the end of the tool life is reached and a predetermined time t3 preceding the time t2; and a piece of the machining information before the predetermined time t3 preceding the time point at which the end of the tool life is reached, thus the clusters of the respective time periods are created, and it is determined which cluster the machining information acquired at the time of machining by the machine tool 1 belongs to, which makes it possible to carry out more detailed estimation of how long it will take to reach the end of the tool life.

Although the embodiments of the present invention have been described above, the present invention is not limited to the examples of the above-described embodiments, and other modes can be implemented with modifications made thereto as appropriate.

The invention claimed is:

1. A tool life estimating device for estimating a life of a tool used by a machine tool for machining a workpiece, the device comprising:
a state observation unit configured to observe log data that has been recorded during the operation of the machine tool so as to find as input data machining information indicative of a status of the machining that has been recorded in a state where the life of the tool remains sufficiently;
a learning unit configured to construct a learning model in which clusters of the machining information are created, the learning model being constructed by unsupervised learning using the input data created by the state observation unit; and
a learning model storage unit configured to store the learning model,
wherein the machining information includes a portion corresponding to a period of time between a predetermined time and an end of the tool life, and a remaining portion, the clusters being created from the remaining portion defining the state where the life of the tool remains sufficiently, and
the learning unit is configured to exclude the portion of the machining information corresponding to the period of time between (i) the predetermined time preceding tool replacement and (ii) a time point where it is determined that the tool has reached the end of the tool life and is to be replaced by another tool, and extract the remaining portion for creating the clusters.

2. A tool life estimating device for estimating a life of a tool used by a machine tool for machining a workpiece, the device comprising:
a learning model storage unit configured to store a learning model in which clusters of the machining information are created by unsupervised learning using machining information indicative of a status of the machining that has been recorded in a state where the life of the tool remains sufficiently during the operation of the machine tool;
a state observation unit configured to acquire to the machining information indicative of the status of the machining from log data recorded while the machine tool is operated, and configured to create input data based on the machining information that has been acquired; and
an estimation unit configured to estimate the life of the tool from the input data created by the state observation unit, the life of the tool being estimated using the learning model,
wherein the machining information includes a portion corresponding to a period of time between a predetermined time and an end of the tool life, and a remaining portion, the clusters being created from the remaining portion defining the state where the life of the tool remains sufficiently, and
the clusters exclude the portion of the machining information corresponding to the period of time between (i) the predetermined time preceding tool replacement and (ii) a time point where it is determined that the tool has reached the end of the tool life and is to be replaced by another tool, and include the remaining portion.

3. A machine tool comprising:
an alarm unit configured to output an alarm based on an estimation result of the life of the tool by the tool life estimating device according to claim 2.

4. The tool life estimating device according to claim 2, wherein the estimate unit is configured to estimate that
the life of the tool remains sufficiently when the input data belongs to the clusters of the machining information, and
the life of the tool does not remain sufficiently when the input data does not belong to the clusters of the machining information.

* * * * *